Sept. 13, 1932.                L. L. CUNNINGHAM                1,877,275
                              FUEL CONTROL APPARATUS
                       Filed Feb. 25, 1928        2 Sheets-Sheet 1
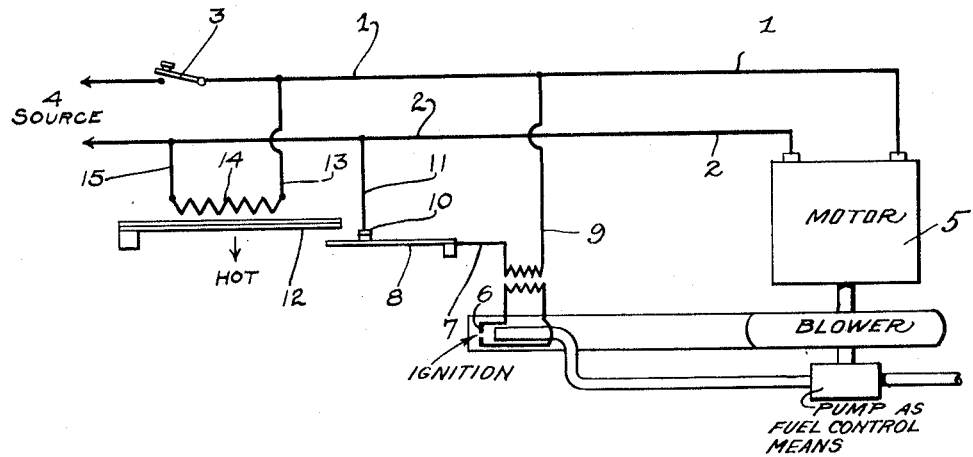
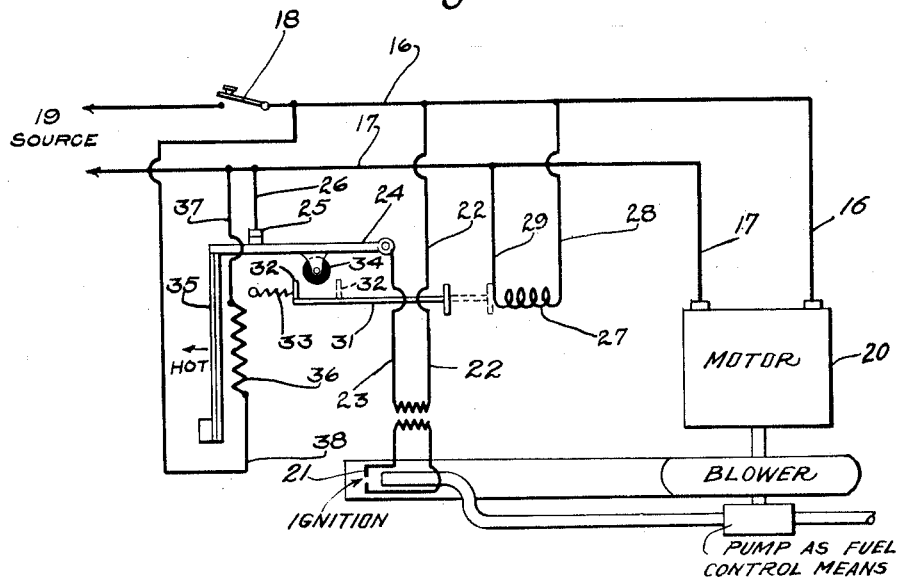
Inventor
LEWIS L. CUNNINGHAM
By
  Attorneys

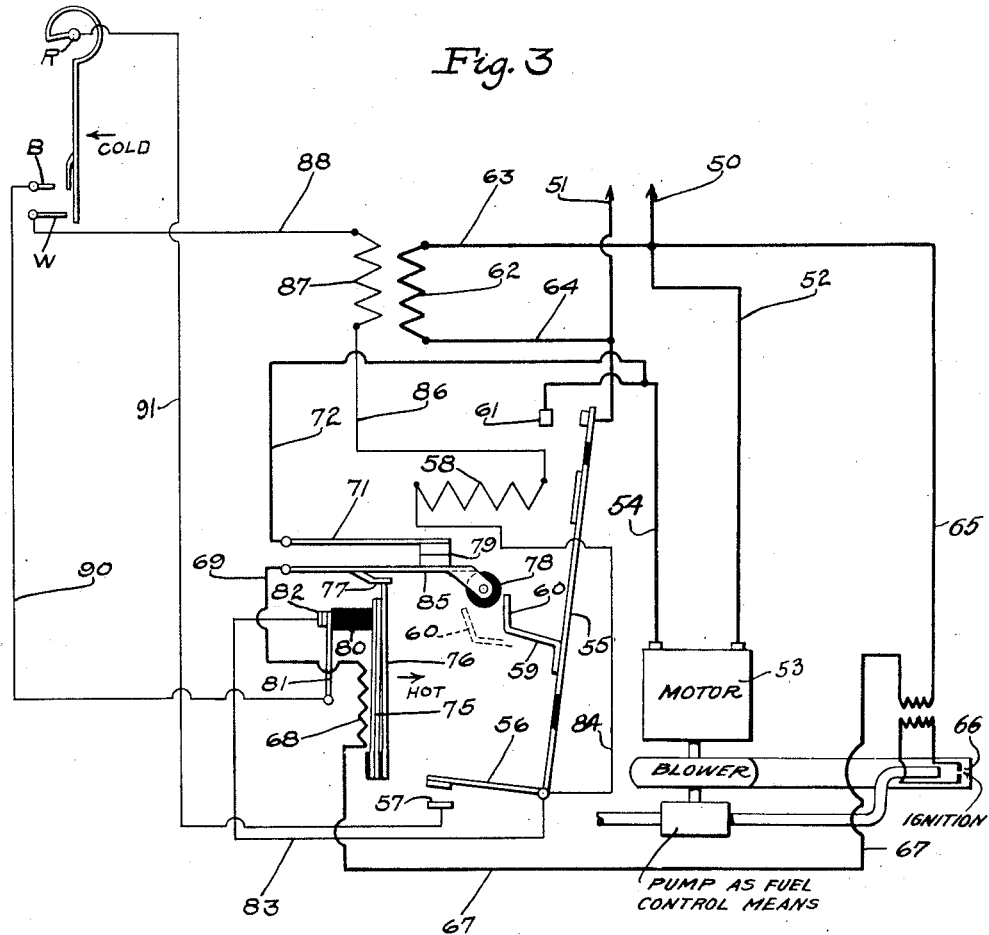

Patented Sept. 13, 1932

1,877,275

UNITED STATES PATENT OFFICE

LEWIS L. CUNNINGHAM, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

FUEL CONTROL APPARATUS

Application filed February 25, 1928. Serial No. 256,922.

This invention generally relates to improvements in fuel control apparatus, and particularly to a device for controlling a supply of fuel and ignition, and timing this supply, or these supplies, to unfailingly obtain a delivery over a predetermined length of time whenever and immediately after a burner motor or equivalent device is started. The main purpose is to operate in such a manner that in case of ignition failure from any cause, a trial ignition over a predetermined period of time can be unfailingly obtained, at the end of which if ignition does not take place the fuel supply will be discontinued.

Among other objects are to provide a timing mechanism for the above purpose, which is reset after each trial ignition period, and so that the timing element of the timing device will always start from an initial position, and wherein the burner motor circuit cannot be closed until the control portion of the timing device has reached this predetermined initial position, so that if allowed to operate over a predetermined length of time, the full and predetermined timing period is unfailingly obtained; and therefore to provide means whereby during an ignition period, when delivering either oil or gas or operating an ignition means, the timer will obtain such delivery over a predetermined length of time whether ignition is successful or not; to provide a circuit including fuel control and ignition means, and a timing device operable whenever said circuit is energized, to open a fuel control means circuit at the end of a predetermined time; to provide a device in which the ignition circuit is a branch of the motor circuit, and in which this circuit and the motor circuit are in parallel; to provide a device in which two circuits are controlled by the same switch, to-wit: the burner motor, and ignition circuits; to provide timing means including a switch which controls the timing means circuit, and which also controls the fuel control means circuit; to provide a relay or equivalent device for simultaneously controlling two circuits, one of which is thermostatically controlled, and to arrange a timing device, (as a thermally controllable apparatus) having a bimetallic element, for controlling the ignition means circuit, arranged so that it must be cooled in a predetermined degree before the relay or equivalent device can close a burner motor circuit; and to provide means whereby a closing of the ignition control means circuit always takes place after the burner motor circuit is opened.

Features of the invention include all the details of construction of all forms illustrating the application of the invention, along with combinations and sub-combinations of the parts, as well as the broad idea of providing means whereby a full timing period is provided upon a start of the apparatus, whatever the varying conditions of the other parts of the apparatus.

Advantages, objects and features of the invention will be further pointed out in the description of the drawings forming a part of this application and in said drawings Figure 1 is a diagrammatic view showing a simple application of the invention wherein for each energization of the fuel supply and/or burner motor circuit, the timing device is energized and at the end of a predetermined time will break the ignition control means circuit;

Figure 2 shows an application of the invention in which electro-mechanical means for resetting the timer and closing the ignition and/or fuel control means circuit both on energization and de-energization of the fuel supply means and/or burner motor circuit; and Figure 3 shows an application of the invention in which a single thermostatically controlled relay operates to close the ignition circuit and/or set the timer at each movement of the relay to close the motor circuit, and in which a thermostatically controlled device controls operation of the relay, and which includes starting and holding circuits, with the arrangement such that the starting circuit cannot be energized, until the timer occupies an initial starting position.

Numerals 1 and 2 indicate main lines and 3 indicates a switch controlling the main line. Numeral 4 stands for the source. Numeral 5 indicates air and fuel control and delivery means and/or a burner motor, shown diagrammatically. Ignition control means is diagrammatically indicated at 6. This means is electrically operable and is connected by conductor 7 with a switch arm 8 which engages contact 10 connected by conductor 11 with main line 2. The other side of the element 6 is connected by conductor 9 with main line 1. Numeral 12 indicates a thermally operable element of a timing means such as the blade of a warp-switch. A resistance coil for operating the element 12 is indicated at 14 and is connected across the main line by means of conductors 13 and 15. In this device, it will be seen that on energization of the main line, the element 12 will be heated and will move in direction of the arrow and at the end of a predetermined time, will open switch 8. This device, therefore, provides a circuit including fuel control and ignition means, and a device operable whenever the circuit is energized to open the ignition means circuit at the end of a predetermined period.

During an ignition period either gas or oil or some equivalent fuel is being delivered and it is desirable that this delivery take place during a predetermined time regardless of whether ignition takes place or not but not beyond a predetermined time. This timed interval is such that if all ignition conditions are right ignition will take place. It will be understood that other means, not herein shown, are depended on to shut down in case of ignition failure.

In Figure 2, numerals 16 and 17 represent the main lines, and 19 indicates the source. Numeral 20 diagrammatically indicates a fuel supply means and/or a burner motor. 21 diagrammatically indicates ignition means used in conjunction with automatically controlled ignition systems. The fuel control means is connected on one side by conductor 22 with main line 16, and on the other side is connected by conductor 23 with switch arm 24, engageable with contact 25, in turn connected by conductor 26 with main line 17. In this application of the invention, the switch element 24 is shown as resting against the end of a thermo or timing control element 35, as part of the timing mechanism. The movement of this thermo element is controlled by coil 36, arranged across main lines and connected in the main line respectively by conductors 37—38 substantially as shown. When the element 35 is heated it moves in the direction of the arrow and releases the element 24 which moves away from contact 25, and thus opens the ignition control means circuit.

Means is here provided for causing the element 24 to make contact at 25 on energization and/or de-energization of the main line or fuel control means and/or burner motor line. This means is in the nature of a latch, in this instance, electrically operated and including a coil 27, connected across the main line by conductors 28—29. A movable armature 31, of this electrically operable device, is provided with a retracting element 33 normally holding the armature 31 in the position shown. When coil 27 is energized element 33 by its projection 32 engages the element 34 of the switch 24 and closes the switch. During energization, element 31 moves, in this instance, to the right and the projection 32 assumes the position shown in dotted lines at the opposite side of the element 34. On de-energization of the coil 27, the element 31 moves in the opposite direction to assume the full line position shown. During each movement, the switch 24 is moved to closed position. It is obvious that in some instances, the element 31 may move to a position in which the projection 32 engages the element 34, and remain in this position to hold the switch 24 closed as long as the coil 27 is de-energized.

In the operation of the device, when the switch 18 is closed and when the device is in the position shown in full lines in Figure 2, all circuits are energized, heater element 36 of the timer causes movement of the element 35 in direction of the arrow and at the end of a predetermined movement and time, the switch 24 is released. Upon this initial energization element 31 is pulled by coil 27, to the position shown in dotted lines, and when at a later period it is released, the element 31 again assumes the position shown in full lines or assumes the position wherein the projection 32 engages element 34 to mechanically raise or move the switch to closed position, as the projection 32 moves in either direction.

It will be seen therefore that this invention provides resetting means operable to cause the ignition means circuit switch to be moved to closed circuit position whenever the main line is energized or de-energized.

This invention also includes, as shown in Figure 3, means for thermostatically controlling the closing of the motor circuit, as well as the timing circuit, such closure operating the resetting means. Moreover, this invention further provides as shown in Figure 3 starting and holding circuits in which the starting circuit is broken at the beginning of the timing cycle, and in which it is only made when the timing device is in that position from which it is capable of completing a full timing cycle.

Main lines are shown at 50—51, a branch of line 50 is shown at 52 and connects with one side of the air and fuel control and delivery means and/or burner motor or equivalent device, or devices 53. The other side of this device 53 is connected by conductor 54 with contact 61 of the main switch. A relay, or equivalent device, having a coil 58 has an armature 55 cooperable with contact 61, and also has an arm 56 cooperable with holding contact 57 of the thermostatic circuit. The armature 55 has mechanical means 59 having an extension 60 engageable with element 78 of switch arm 85, which arm is cooperable with contact 79 of arm 71. The arm 71 is connected by conductor 72 with line 54. It will be seen that when the coil 58 is energized, in this instance, by the closure of a thermostatically controlled circuit, the motor line will be closed at 61, and the holding contact for the thermostatic circuit will be closed at 57. At or substantially at the same time the element 60 will engage element 78 to close the timer and ignition means circuit at 79. On energization of coil 58 the burner motor is energized, the ignition and timer circuit is energized, and the holding contact for the thermostatic circuit is closed.

The element 60 may be considered as part of the resetting mechanism for the timing device, which device includes a heating coil 68 connected on one side by conductor 67 with ignition means 66, which means is connected to main line 50 by conductor 65. Main line 50 is also connected by conductor 63 with the primary 62 of the transformer which is in turn connected by conductor 64 with the main line 51. The other side of the heating element 68 is connected by conductor 69 with the switch element 85. Contact 79 and arm 71 are connected by conductor 72 with line 54. It will be seen that whenever the motor is energized the heating coil 68 is energized. However, in some instances the heating element may be connected directly across the main line, and as thus connected, (see Figure 1) is constantly heated. Another portion of the timer in this instance includes the thermo element 75 which moves in the direction of the arrow when heated. This element engages against an element 76 which may be considered a latch element, and part of a latching mechanism, including, among other things, the element 77 of the switch arm 85, as a shoulder. Upon sufficient movement which is a predetermined movement occurring in a predetermined time the element 76 is forced beyond the end of the element 77 to allow 85 to open its circuit. It will be noted that after this opening the element 76 will engage against the stop 77 which acts to prevent 76 from assuming the position shown in full lines in the drawings. However, the element 75 is free to move when cooling and to finally assume the position shown in full lines in the figures. Upon energization of the coil 58, element 60 raises element 85, and element 76 again assumes the position shown in full lines in the figures.

One of the purposes of the latch, is to allow opening of the circuit quickly, and thus to make for economic operation, by cutting off the current to the heating element so that the circuit is not re-established during cooling, and therefore so that the coil is not constantly heated. This permits of a design of switch to which more heat can be applied because it is applied only over a short period, and therefore in which a more rapid and/or more forceful movement of the thermal member can be had. It will be understood that this thermally operable member as a heat storage device moves to a degree corresponding to the temperature.

Another part of the invention includes the thermostatic switch, as for example a room thermostat, comprising a movable element R sequentially engageable with contacts B and W. Contact W is connected by conductor 88 with a secondary 87 of the transformer, the other side of which secondary is connected by conductor 86 with coil 58 of the relay or equivalent device. The other side of the coil 58 is connected by conductor 84 with arm 56, and arm 56 and conductor 84 are also connected by conductor 83 with the contact 82. Contact 82 is engageable by arm 81 to close its circuit, and this arm is connected by element 80 for movement by the thermo element 75. Arm 81 is connected by conductor 90 with contact B of the thermostatic device. Starting contacts 81—82 make or close only when element 75 is at that position at which it begins its timing movement, and this closure can only take place when the element 75 is sufficiently cool.

The element 76 could be dispensed with, and the element 75 caused to make direct contact with the element 77. However, there are objections to this construction because the bimetallic blade would then be called upon to perform a latching operation, which might deform it, during cooling as the result of engagement with the shoulder 77. It will be noted that the bronze blade 76 receives the strain, and that the blade 75 is left free for independent movement when cooling.

*General operation*

Referring to Figure 3, the element 75 of the timer is assumed to be cold, and the starting contact 82 is closed. The element 76, (which is arranged to be moved by the element 75 to release arm 85 and open contact 79) is now positioned to hold the switch 85 closed. The motor circuit is open and the holding contact 57 is open. Assume that the element R cools sufficiently to close the circuit across contacts W—B. Under these conditions coil 58 receives current as seen by tracing the circuit from 87 through 88, W, R, B, 90, 81, 82, 83, 84, 58, 86, back to 87. When armature 55 closes, contact 61 closes and the fuel control means and/or motor burner circuit is closed, as will be seen by tracing the circuit from 50 to 52, 53, 54, 61, back to 51. Coil 68 also receives current when this motor circuit is closed and this circuit can be traced from line 51, 61, 54 to 72, arm 71, contact 79, arm 85 to 69, coil 68, 67, to ignition control means 66, and thence through 65 to 50. At the same time the holding contact 57 is closed, and thereafter contact may be broken at B—R without de-energizing the coil 58. Coil 68 now begins to heat, and the element 75 (or equivalent element of a timing device), moves in direction of the arrow, the element 76 moving with the element 75. Immediately at the beginning of this movement the contact is broken between 81 and 82, and thereafter, if for any reason coil 58 is de-energized, it cannot be again energized until 75 cools sufficiently to close the starting contact 81, 82. The coil 58 is maintained energized through the following circuit, 87, 88, W, R, 91, 57, 56, 84, coil 58, 86, back to 87. At the end of the full timing cycle whether ignition takes place or not, element 76 passes beyond element 77 to permit 85 to break its circuit.

Thereafter the element 76 is prevented from returning to the position shown in the drawings, as the result of its engagement with the end of the stop 77. The element 77 as arranged permits 85 to move to open position when the element 76 is moved outwardly by the thermo element 75. When the arm 85 moves to closed position 76 is released and again assumes the latching position shown. When the relay closes the element 60 assumes the dotted line position, so that 85 may open and so that when the relay opens 85 will be forced to closed circuit position by engagement of 60 with 78. However, it will be noted that the thermo element 75 is always free to move independently by a cooling movement, to close its contact 81, whatever the position of the element 76. Eventually contact will be broken at R—W (by heating of the element R) and relay armature 55 will move to open position. As the result of this movement, 85 will be raised by engagement of 60 with 78, and 76 will be released to assume the normal or latching position, securing element 85 in closed circuit position.

A holding circuit is desirable so that it can be broken during the time that the relay is energized. This starting circuit can only be energized, however, when the element 75 is sufficiently cold to close the contacts 81—82. It will be noted that while the contacts 56—57 are used to maintain the relay in closed position they cannot be used to obtain a closing of the relay.

The timer, in this instance a thermo element of a warp-switch, only performs its timing movement when and after the motor and/or ignition circuits are closed, and can only be opened when the relay is closed and when the heating element 68 is sufficiently hot. The thermo element 75 of the timer is always free to move by a cooling movement to close the starting contact, and this contact is only closed, and the timer can only begin its timing cycle, when the element 75 has cooled and reached a predetermined initial position, from which position such start can be made as will positively assure a predetermined timing movement. Because of this it is impossible to shorten the timing cycle or vary it and this is an important feature of the invention. The starting circuit is, therefore, broken at the beginning of every timing cycle, and, therefore, the fuel control circuit cannot be closed until the timer is conditioned to move a predetermined distance which is a measure of the full timing cycle.

There is no intention to be limited to the details of construction, although these are claimed. Moreover, there is no intention to be limited to the use of a warp-switch as a timer, nor to the use of a relay for the purposes set forth.

It will of course be understood that although in the diagram of the burner apparatus a pump has been shown as a fuel control means which is directly operated by the motor, it is conceivable that other fuel control means may be used which operates to discontinue the fuel supply when the motor circuit is broken. There is no intention to be limited to the mechanical connection shown because it is conceivable that an electrically controllable fuel line control valve could be connected in the motor circuit and arranged to be held in open position to supply fuel as long as the motor circuit is energized.

I claim as my invention:

1. A switch biased to open, a latch for securing the switch in closed position, an electrically controllable timer and a control circuit therefor controlled by the switch, electrically controllable means having means for closing the switch when energized, a control circuit for said electrical controllable means including a contact controlled by said timer to be closed only when the timer is in a predetermined de-activated timer-starting position, and means by which said timer controls the latch to release the switch at the end of a predetermined time after timer activation.

2. A timing device including an electrically controllable heater and a thermal element controlled thereby, a circuit for the heater and first and second switches controlling the circuit, both of which must be closed to activate the heater, the first switch having means adapted to close the second switch when the first closes, the electrically operable means for controlling the first switch including a circuit having a contact, and means by which said thermal element only when sufficiently cold closes the contact, a latch element and means for controlling it by said thermal element to latch the second switch in closed position only after closure of the contact and adapted to release the second switch for automatic opening at the end of a predetermined time after activation of the heater.

3. A timing device including an electrically controllable heater and a thermal element controlled thereby, a circuit for the heater and first and second switches controlling the circuit both of which must be closed to activate the heater, the first switch having means adapted to close the second switch when the first closes, electrically operable means for controlling the first switch including a circuit having a contact, and means by which said thermal element only when sufficiently cold closes the contact, a latch element and means for controlling it by said thermal element to latch the second switch in closed position only after closure of said contact, and adapted to release the second switch for opening at the end of a predetermined time after activation of the heater, said first switch having means which prevents movement of the latch to latching position when the second switch is open, but which releases the latch element for motion to latch position on closure of the second switch.

4. A timer including a movable thermal element and an electrically controllable heater for controlling the element, a circuit for the heater controlled by a switch biased to open, a relay controlling energization of the heater circuit and having means for moving the switch to closed position when the relay closes, a control circuit for the relay having therein a starting contact which must be closed to obtain relay closure and means by which the starting contact is controlled by the thermal element to be closed on sufficient cooling of said element, an element controlled by the thermal element to latch the switch in closed position only after the thermal element has closed the starting contact and adapted to release the switch for quick opening after a predetermined degree of heating motion, means controlled by the switch when in open position and after latch release to prevent return of the latch element to latching position, action of said means during switch closure being to cause release of the latch element to permit it to assume latch position after switch closure.

5. In combination, a timer including a movable thermal element and an electrically operable heater for controlling the element, a circuit for the heater controlled by a switch biased to open, a relay controlling energization of the heater circuit and having means for moving the switch to closed position when the relay closes, a control circuit for the relay having therein a starting contact which must be closed to obtain relay closure and means by which the starting contact is controlled by the thermal element to be closed on sufficient cooling of said element, an element controlled by the thermal element to latch the switch in closed position only after the thermal element has closed the starting contact and adapted to be positively moved by the thermal element as it heats and to release the switch for quick opening after a predetermined degree of heating motion, said thermal element being adapted to move independently of the latch element during cooling movement, means controlled by the switch when in open position and after latch release to prevent return of the latch element to latching position, action of said means during switch closure being to cause release of the latch element to permit it to assume latch position after switch closure, control means and circuit therefor controlled by said relay to be activated by closure of the relay.

In witness whereof, I have hereunto set my hand this 20th day of February 1928.

LEWIS L. CUNNINGHAM.